No. 707,359. Patented Aug. 19, 1902.
P. J. SCHARBACH.
CHANGEABLE GEAR FOR BICYCLES.
(Application filed Jan. 3, 1902.)
(No Model.) 3 Sheets—Sheet 1.
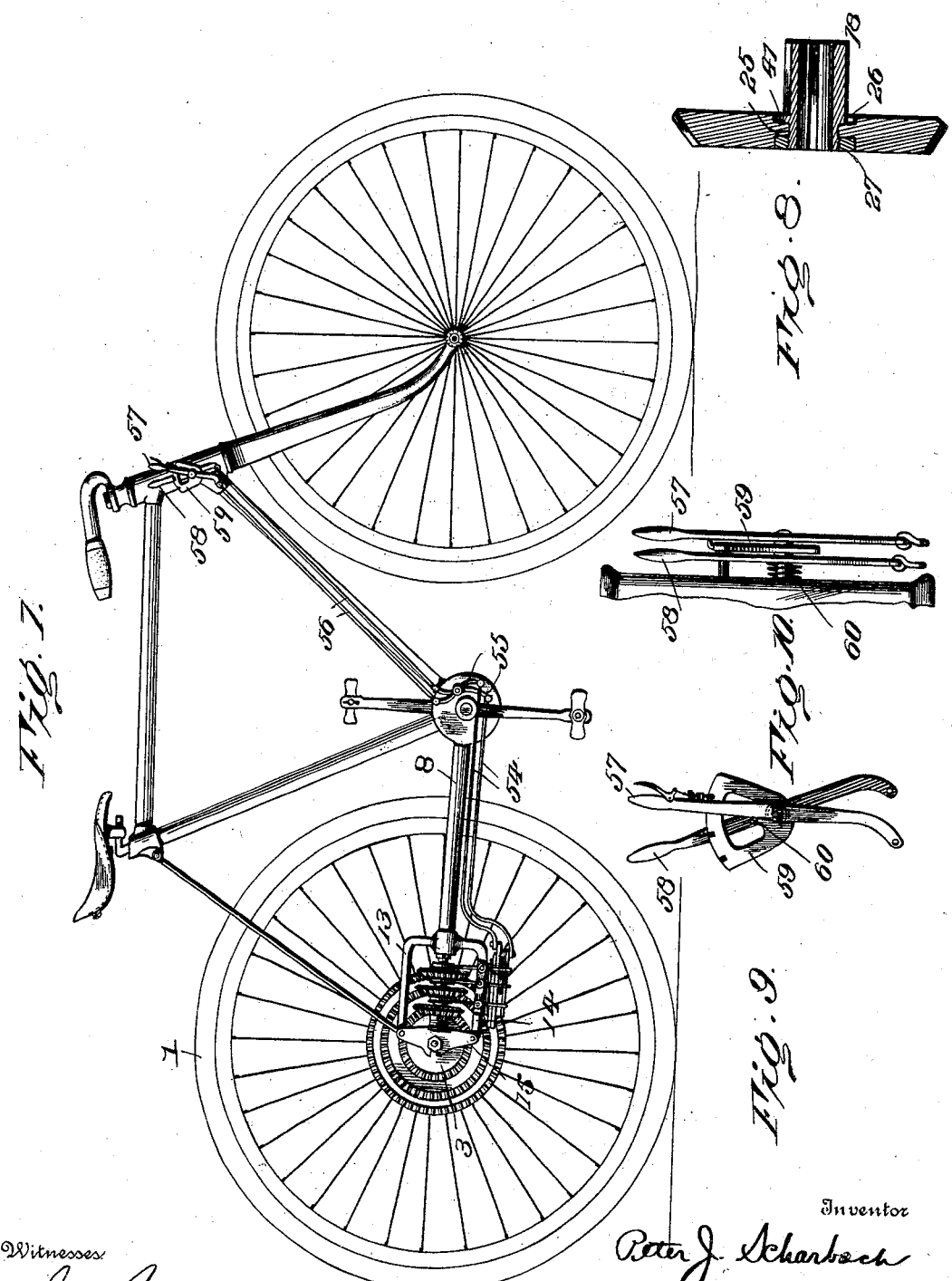

No. 707,359. Patented Aug. 19, 1902.
P. J. SCHARBACH.
CHANGEABLE GEAR FOR BICYCLES.
(Application filed Jan. 3, 1902.)
(No Model.) 3 Sheets—Sheet 2.
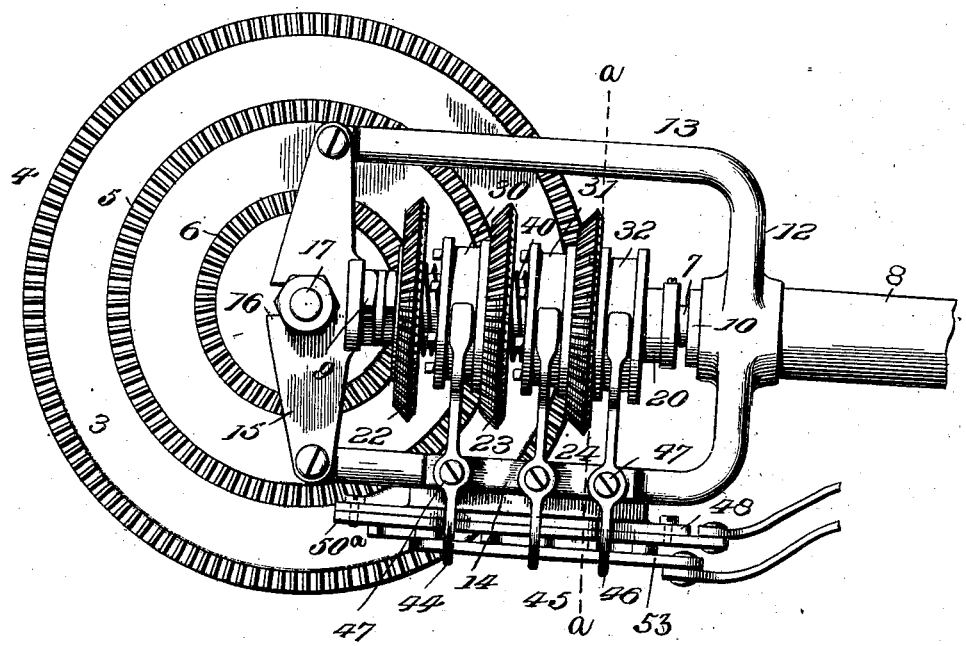
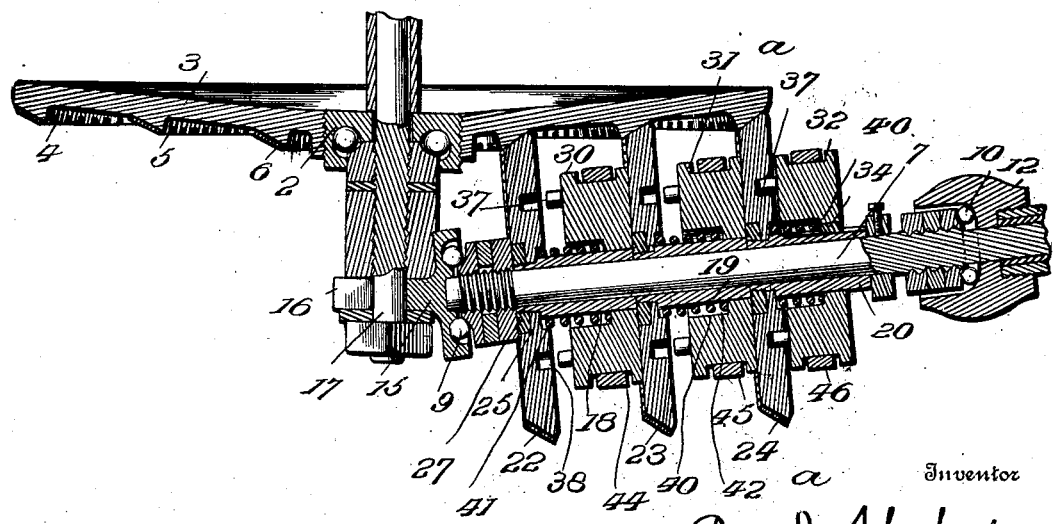

No. 707,359. Patented Aug. 19, 1902.
P. J. SCHARBACH.
CHANGEABLE GEAR FOR BICYCLES.
(Application filed Jan. 3, 1902.)
(No Model.) 3 Sheets—Sheet 3.
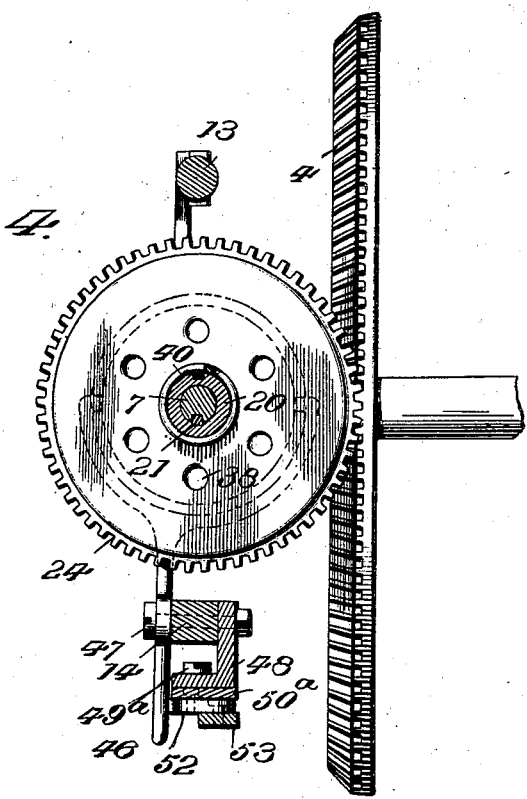
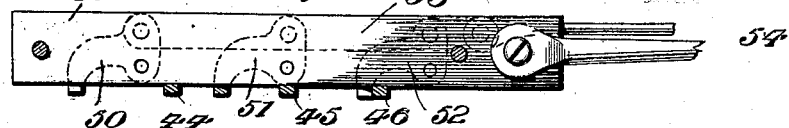
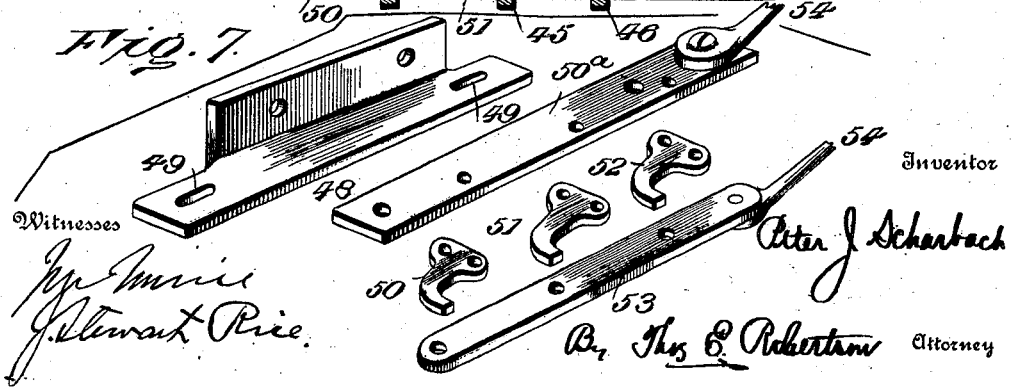

UNITED STATES PATENT OFFICE.

PETER J. SCHARBACH, OF PE ELL, WASHINGTON.

CHANGEABLE GEAR FOR BICYCLES.

SPECIFICATION forming part of Letters Patent No. 707,359, dated August 19, 1902.

Application filed January 3, 1902. Serial No. 88,346. (No model.)

*To all whom it may concern:*

Be it known that I, PETER J. SCHARBACH, a citizen of the United States of America, and a resident of Pe Ell, in the county of Lewis and State of Washington, have invented certain new and useful Improvements in Changeable Gear for Bicycles, of which the following is a specification.

This invention relates to an improvement in that class of changeable gears for chainless bicycles in which a plurality of bevel-gears are employed which are in constant mesh with a plurality of gears formed, preferably, in the shape of a disk connected with and revolving with the driving-wheel.

The object of my invention is to provide a changeable gear of this class in which the clutches controlling the gearing may be readily operated from near the handle-bar and in which the mechanism is simple and durable and easily replaced when worn.

My invention therefore consists of the changeable gear, as hereinafter more particularly described and then definitely set forth by the claims at the end hereof.

In the accompanying drawings, Figure 1 is a side elevation of a bicycle with my invention applied thereto. Fig. 2 is a side elevation of the gearing on an enlarged scale. Fig. 3 is a horizontal central section of the same. Fig. 4 is a cross-section through line *a a* of Fig. 2. Figs. 5, 6, and 7 are details of the "triggers" and their supporting-bars. Fig. 8 is a sectional view of one of the gears and its sleeve on an enlarged scale. Figs. 9 and 10 are details of the levers for operating the clutches.

Referring now to the details of the drawings by numerals, 1 represents the rear wheel of a bicycle, which may be of any desired construction, to the hub 2 of which is fixedly secured a gear-disk 3, comprising three bevel-gears 4, 5, and 6, which are preferably formed integral and slightly dished, as shown in Fig. 3. The driving-shaft 7 rotates in a sleeve or tube 8, and its rear end is supported by ball-bearings 9 and 10. The bearing 10 is supported by the front end of the yoke 12, and the two arms 13 and 14 of the yoke extend rearwardly and are connected to a flat plate 15, slotted at 16 to receive the axle 17, and the rear bearing 9 is supported by this plate 15.

The parts so far described are all old, and therefore need no further description.

The aforesaid driving-shaft 7 has three sleeves 18, 19, and 20 keyed thereto, preferably by a single key 21, so that the sleeves rotate with the shaft. These sleeves have three bevel-gears 22, 23, and 24 journaled thereon and are so situated with respect to the bevel-gears 4, 5, and 6 on the gear-disk that all of said gears are in constant mesh. To prevent these gears 22, 23, and 24 from sliding out of mesh with their companion gears and yet permit them to be idle on the sleeves or thimbles, I form each sleeve or thimble with a bearing 25 and shoulder 26. These gears are thus enabled to rotate on the bearing-surfaces 25 and held from lateral movement by the shoulder 26. On the opposite side a nut 27 is screwed onto the sleeve or thimble and countersunk in the bevel-gear, so as to prevent the gears from being displaced from the sleeves.

Slidingly secured on the sleeves 18, 19, and 20 are three "pin-clutches" 30, 31, and 32, which are secured thereto by keys 34, so as to rotate with the said sleeves and with the drive-shaft 7. These clutches each are formed with a series of pins 37, which are arranged and adapted to engage with perforations 38 in each of the gears 22, 23, and 24 when the clutches are moved into operative connection with said gears, as hereinafter described. To keep these gears and clutches normally out of engagement, I employ springs 40, which are located around the sleeves 18, 19, and 20 and are seated within annular grooves 41 and 42 in the gears and clutches, as clearly shown in the drawings.

It follows from the construction so far described that when the springs 40 keep the clutches out of engagement with the bevel-gears 22, 23, and 24 the latter may run idly on the sleeves 18, 19, and 20 and that when any one of the clutches is moved to engage with its appropriate gear motion will be transmitted from the drive-shaft 7, one of its sleeves and clutches, and the bevel-gears to the bevel-gears on the driving-wheel. To accomplish this movement of the clutches at such times and under such conditions as may be determined by the rider, I employ the following mechanism: Three clutch-levers 44, 45, and 46, engaging grooves in the clutches 30, 31, and 32, are pivoted on the lower arm 14 of the yoke 12 by means of three bolts 47. These bolts project entirely through the arm 14 and secure thereto an angle-bar 48, provided with slots 49. Slidingly secured to said angle-bar by screws 49$^a$, passing through said slots, is a bar 50$^a$, to which are pivotally connected three triggers 50, 51, and 52, which latter are arranged to coact with and operate the clutch-levers. Connected with these triggers is a second bar 53, and these two bars 50$^a$ and 53 are operated, through intermediate connections 54, 55, and 56, by means of two levers 57 and 58, pivoted on the main frame within convenient reach of the rider. The lever 57 connects with bar 50$^a$, and it is operatively connected with a quadrant 59, having three notches therein, so as to hold the bar 50$^a$ in any one of three positions. The other lever 58 has a spring 60 connected therewith, so as to normally hold the bar 53 in the position shown in full lines in Figs. 2 and 3. These two levers thus allow the rider to control the positions of the pin-clutches and through them determine which of the three gears shall be used to transmit the power from the drive-shaft 7 to the driving-wheel.

The operation of my device is as follows: When the rider desires to use the lowest gear, the two levers are placed as shown in Fig. 1, where clutch 32 is engaging gear 24, when the other two gears run idle. If it is now desired to change the gear, the operator moves the lever 58 to move bar 53 relatively to bar 50$^a$, which movement causes the triggers to assume the inactive positions shown in dotted lines in Fig. 6. The other lever 57 is now moved until the bar 50$^a$ slides on angle-bar 48 sufficiently far to permit trigger 52 to clear its clutch-lever 46, when lever 58 is released, and the spring 60, acting thereon, causes its movement, which in turn moves the triggers in their active positions. The forward movement of lever 57 will now move bar 50$^a$ and its triggers forward, and as the second trigger 51 now engages its clutch-lever 45 clutch 31 will be moved to engage with bevel-gear 23, and as this gear meshes with one of the smaller gears on the gear-disk the gear will be set correspondingly higher. Of course the operation for engaging clutch 30 with its gear 22 is similar to that just described.

From the foregoing and the accompanying drawings it will be seen that I have invented a changeable gear for bicycles by which the gearing may be easily altered, as the bevel-gears are always in mesh, and as the gears rotate on removable sleeves instead of on the drive-shaft itself the worn parts may be easily replaced when necessary.

What I claim as new is—

1. The combination in a changeable gear for cycles and with the rear wheel thereof having a gear-disk provided with a plurality of gears thereon, a driving-shaft, a plurality of gears supported on said shaft and meshing with the gears carried by the rear wheel, gear-clutches, clutch-levers, and triggers for operating said clutch-levers, said triggers arranged to be thrown into inactive position, substantially as described.

2. The combination in a changeable gear for cycles and with the rear wheel thereof having a plurality of gears, of a drive-shaft, a plurality of gears supported by said shaft and meshing with the gears carried by the said rear wheel, clutches coacting with said gears, clutch-levers, a series of triggers coacting with said clutch-levers and means for operating said triggers, substantially as described.

3. The combination in a changeable gear for cycles and with the rear wheel thereof having a plurality of gears, of a drive-shaft, having a plurality of gears meshing with the gears carried by the rear wheel, a series of clutches and clutch-levers for the same, a plurality of triggers coacting with said clutch-levers, and two levers and intermediate connections for operating said triggers, one of said levers arranged to throw said triggers into inactive positions, substantially as described.

4. The combination in a changeable gear for cycles and with the rear wheel thereof having a plurality of gears thereon, of a drive-shaft carrying a plurality of gears meshing with the aforesaid gears, a plurality of clutches and clutch-levers coacting with said gears, a bar slidingly arranged with relation to said clutch-levers, a plurality of triggers supported by said bar, and two levers and intermediate connections for operating said bar and triggers, one of said levers arranged to slide said bar, and the other lever arranged to move said triggers into inactive position, substantially as described.

5. The combination in a changeable gear for cycles and with the rear wheel thereof having a plurality of gears thereon, of a drive-shaft carrying a plurality of gears and clutches, a plurality of clutch-levers, a plurality of triggers for operating said clutches, a lever arranged to throw said triggers into inactive position, and a spring arranged to hold said lever in position, substantially as described.

6. The combination in a changeable gear for cycles and with the rear wheel thereof carrying a plurality of gears, a drive-shaft carrying a plurality of gears and clutches for the same, a plurality of suitably-supported clutch-levers, a bar suitably supported near such clutch-levers, a second bar slidingly supported by said first bar and carrying a plurality of triggers, two levers, and intermediate connections between said levers and the sliding bar and the triggers, substantially as described.

Signed by me at Washington, District of Columbia, this 31st day of December, 1901.

PETER J. SCHARBACH.

Witnesses:
THOS. E. ROBERTSON,
J. STEWART RICE.